(12) United States Patent
Northedge

(10) Patent No.: US 6,517,045 B1
(45) Date of Patent: Feb. 11, 2003

(54) VALVE ASSEMBLY

(76) Inventor: Ronald Northedge, Euromatic Machine & Oil Company Limited P.O. Box 297, St. Helier, Jersey (GB)

( * ) Notice: Subject to any disclaimer, the term of this patent is extended or adjusted under 35 U.S.C. 154(b) by 0 days.

(21) Appl. No.: 09/806,079
(22) PCT Filed: Oct. 1, 1999
(86) PCT No.: PCT/GB99/03259
§ 371 (c)(1), (2), (4) Date: Mar. 23, 2001
(87) PCT Pub. No.: WO00/20785
PCT Pub. Date: Apr. 13, 2000

(30) Foreign Application Priority Data

Oct. 2, 1998 (GB) .............................................. 9821352
Aug. 11, 1999 (GB) .............................................. 9918822

(51) Int. Cl.$^7$ ............................................. F16K 31/02
(52) U.S. Cl. ................................... 251/65; 251/129.16
(58) Field of Search ............................ 251/65, 129.16, 251/129.15

(56) References Cited

U.S. PATENT DOCUMENTS

| 3,203,447 A | * | 8/1965 | Bremner et al. ............... 251/65 |
| 4,018,419 A | * | 4/1977 | Monpetit ..................... 251/65 |
| 4,253,493 A | | 3/1981 | English |
| 4,306,589 A | * | 12/1981 | Harned et al. ................. 251/65 |
| 4,481,389 A | * | 11/1984 | Johnson ....................... 251/65 |
| 4,506,701 A | * | 3/1985 | Masaki et al. ................. 251/65 |
| 4,690,371 A | | 9/1987 | Bosley et al. |
| 4,750,705 A | * | 6/1988 | Zippe ........................... 251/65 |
| 4,770,389 A | | 9/1988 | Bodine et al. |
| 5,474,100 A | * | 12/1995 | Nishijima et al. ............. 251/65 |
| 5,547,165 A | * | 8/1996 | Brehm et al. ........... 251/129.16 |
| 6,068,010 A | * | 5/2000 | Reinicke ................ 251/129.16 |
| 6,079,435 A | * | 6/2000 | Franz et al. ........... 251/129.16 |
| 6,145,806 A | * | 11/2000 | Dettmann ..................... 251/65 |

FOREIGN PATENT DOCUMENTS

| DE | 1232424 | 1/1967 |
| DE | 33 38 111 A1 | 5/1985 |
| DE | 38 02 658 A1 | 8/1989 |
| GB | 1602306 | 11/1981 |
| GB | 2079412 | 1/1982 |
| GB | 2228831 | 9/1990 |
| WO | WO 98/52640 A1 | 11/1998 |

* cited by examiner

Primary Examiner—Henry C. Yuen
Assistant Examiner—John Bastianelli
(74) Attorney, Agent, or Firm—Edwin D. Schindler

(57) ABSTRACT

A valve assembly includes a valve body and, located therein, a valve member which can be moved between a first position, in which the valve is in a first operational mode, and a second position, in which the valve is in a second operational mode. The valve member has a rare earth magnet which, when the valve member is in either one of the two operational modes, causes the valve member to be magnetically biased against movement toward the other operational mode. The valve is provided with a device for generating a magnetic field sufficient for overcoming the magnetic bias in the first or second operational mode, so as to cause the valve member to move to the other of the operational modes.

22 Claims, 2 Drawing Sheets

VALVE ASSEMBLY

BACKGROUND OF THE INVENTION

1. Technical Field of the Invention

The present invention relates to a valve assembly for controlling the flow of liquids or gases or fluid particulate matter within sealed conduit systems, such systems being used for example, without limitation, in the food and drink industry, fire fighting, aviation, aeronautical, space, gas and oil industries, health care, pharmaceutical industry, utility services and process engineering industries.

Small low-pressure valves are usually made of brass, aluminium or plastics, whilst larger valves are typically made of brass and other alloys. Alloys, such as stainless steel, may be required if the controlled fluid is corrosive. Valves may be actuated manually, or mechanically through a servomechanism, or magnetically or pneumatically by the flow of the controlled fluid. The present invention relates to a valve assembly that is actuated magnetically.

2. Description of the Prior Art

It is known from the prior art to provide valves and to provide pulsed electrical current so as to actuate the valve. However the problems associated with conventional types of solenoid valve assemblies is that the coils can generate a great amount of thermal energy. Thus, conventional solenoid valves are of limited use with cryogenic fluids and can cause hygiene problems with their use in the food and drinks industry. Moreover, these valves require a return spring and a plunger mechanism. The spring/plunger being capable of closing the valve against a direction of line pressure when the power to the coil is shut off. Additionally conventional solenoid valves require a seal to separate the internal line pressure one side of the spring/plunger from atmospheric pressure. These seals can wear and/or rupture thus allowing fluid leakage, which can be both hazardous and expensive.

Most large diameter valves installed in industrial systems require substantial electrical installations and/or compressed air facilities to control the flow of liquids or gases. Compressed air facilities in themselves require electrical installation systems and so the cost and difficulty of installing such large diameter solenoid valves can be immense.

A yet further problem associated with conventional solenoid valves is that they are expensive to maintain in that they need to remain permanently energised. So, for example, a solenoid valve that is only operated on a very occasional basis, perhaps once or twice per year, will have to remain fully energised for the entire period. This can be extremely expensive in wattage.

A valve assembly that is easy to install, cost effective to maintain and comprising fewer seals and moving parts would offer an immediate advantage to many industries and would have wide application.

SUMMARY OF THE INVENTION

According to a the present invention there is provided a valve comprising a valve body and, located therein, a valve member movable between a first position in which the valve is in a first operational mode and a second position in which the valve is in a second operational mode, the valve member including a rare earth magnet which, when the valve member is in either one of said positions, causes the valve member to be magnetically biased against movement towards the other of said positions, the valve being provided with means for generating a magnetic field sufficient to overcome the magnetic bias in the first or second position so as to cause said valve member to move to the other of said positions.

Preferably said rare earth magnet is composed of at least one of the elements selected from the group consisting of lanthanum, cerium, praseodymium, neodymium, promethium, samarium, europium, gadolinium, terbium, dysprosium, holmium, erbium, thulium, ytterbium, lutetium, scandium, yttrium and thorium.

Preferably said rare earth magnet is composed of more than one rare earth material, and more preferably said rare earth magnet can be permanently magnetised with its magnetic axis aligned in any selected direction.

Preferably the magnet includes at least one element other than a earth metal. For example iron, boron and/or cobalt, an examples of such compositions are BREMAG (NeFeB) and ANISOTROPIC BREMAG (SmCo). The rare earth magnet is almost impossible to demagnetise using a conventional coil assembly and short periods of opposing magnetic force which will occur when the valve is opened or closed.

Preferably said rare earth magnet is a disc having substantially parallel faces and more preferably said disc is magnetised with its magnetic axis aligned perpendicular to said faces.

Preferably said rare earth magnet is enclosed within the valve body.

Preferably the housing is provided with a seat for the valve member, the seat being provided with a plurality of rare earth magnets arranged in a circular configuration about the valve member. Preferably the rare earth magnets are evenly spaced apart.

Preferably the valve is substantially circular in plan and is of more than 2 inches (5 cm) diameter.

Preferably the valve includes a magnetic coil within which a magnetic field is generated by means of applied electrical current ideally by direct current.

Preferably said coil is composed of iron or iron ferrite.

Preferably power is supplied by a rechargeable battery, such a battery being provided on a vehicle/truck or the like, ideally said battery can operate a relatively large valve thereby eliminating the need for a substantial power supply, moreover the battery can be replenished with a trickle charger using either local power, for example from a telephone supply, or solar power or wind generated power.

Thus, it will be understood that the rare earth magnet oscillates between the two said operational modes i.e. open and closed positions by reversing the direct current excitation voltage across the coil. Reversing the current acts to either attract or repel the rare earth magnet disc between the open and closed positions of the valve. It is only necessary to energise the coil for a short period of time, ideally in the region of 0.25–10 seconds, this is because when the rare earth magnet disc is in an open position it is held in position by its own magnetic attraction to the iron or iron ferrite material employed in the coil construction. This feature offers significant advantage over the prior art.

Preferably said valve comprises a valve seat which is composed of magnetic material.

In a closed position, the rare earth magnet disc is held in position by both its magnetic attraction to magnetic materials in and around a valve seat in addition to the differential pressure across the valve. The time taken to switch the valve between the two operational modes is more rapid than a motorised or pneumatic valve, thus it is envisaged that the valve of the present application has applications in the fire prevention industry and other safety situations.

Preferably said valve comprises a plurality of static seals mounted on one or both of the valve member and valve body to provide sealing therebetween. Preferably, at least one of said static seals is positioned between the rare earth magnet disc and the valve seat and another of said static seals is positioned on an inner surface of an outlet port of the valve.

It is of note that the valve of the present invention does not require any form of seal between the coil and the valve seat. As a consequence, of this there is no possibility of leakage from the valve interior to the surrounding environment, making the present invention particularly suitable as a control valve in conduits/pipes containing flowing explosive material and/or hazardous material and/or material that needs to be pathogen free.

BRIEF DESCRIPTION OF THE DRAWING FIGURES

The invention will now be described, by way of example only, with reference to the following Figures wherein.

DETAILED DESCRIPTION OF THE DRAWING FIGURES AND PREFERRED EMBODIMENTS

Figure 1:
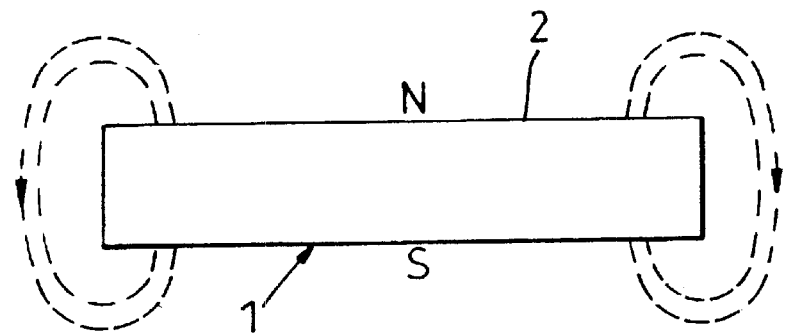
FIG. 1 illustrates a rare earth magnet energisation scheme.

With reference to FIG. 1 there is shown a rare earth magnet 1 having poles S (south) and N (north); current is passed in a selected direction, that direction being at 90° with respect to surface 2. Following magnetisation the rare earth magnet is ready to be incorporated into the valve of the present invention.

Figure 2:
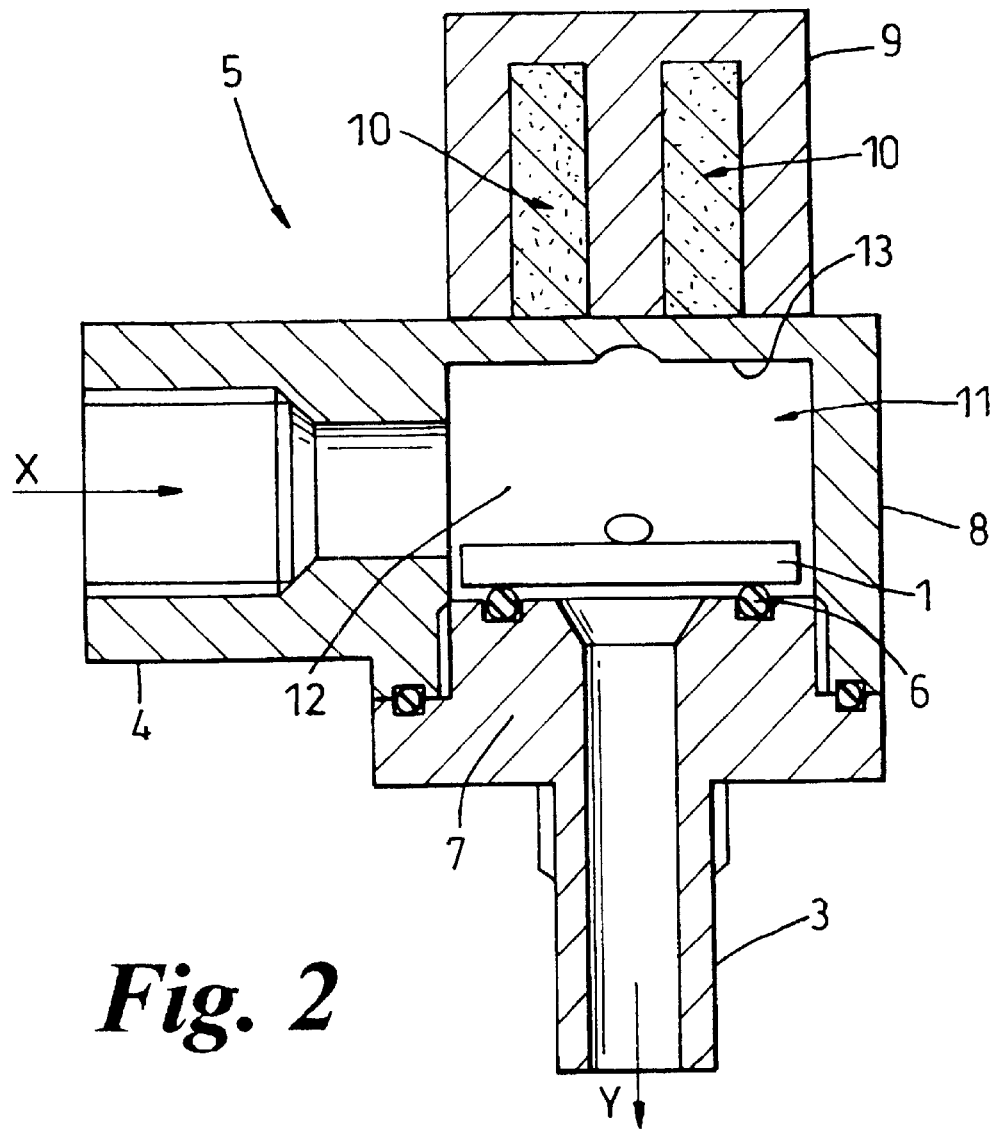
FIG. 2 represents a first embodiment of the valve according to the present invention.

With reference to FIG. 2, there is shown a first embodiment of the valve of the present invention. In this embodiment the valve is for use with a set of pipes 3 and 4, said pipes being positioned substantially at rightangles with respect to each other. In the instance of the valve assembly 5 being in an open position, fluid material flows in direction X to Y. However, in this particular Figure, rare earth magnet 1 is in a closed position abutting valve seal 6 which is positioned within the magnetic material 7 of the valve body 8. Valve body 8 is not constructed of magnetic material.

Opposite pipe 3, the valve is provided with a coil housing 9. Coil housing 9 is constructed of iron or iron ferrite and embedded therein are coils 10. In the instance of the coils being energised by means of applied electrical current, the rare earth magnet 1 is attracted and moves through space 12 to area 11. Once in area the rare earth magnet 1 abuts an inner surface 13 of the valve body 8 and is in an open position thus allowing fluid flow from pipe 4 to pipe 3 in direction X to Y. The current does not have to be constantly applied, and need only be applied for a duration of sufficient time to attract the rare earth magnet to surface 13. When the current is terminated the magnet will remain in positioned by virtue of its attraction to the iron or iron ferrite material of the coil housing. When the current is reversed, again this need only be applied for a short period, the rare earth magnet 1 will be repelled from surface 13 and will return through space 12 so as to abut seals 6 at the opposite end. The rare earth magnet 1 will then be held fixedly in position within the magnetic valve seat 7 so that the valve is in a closed position until the valve needs to be actuated again.

The above-described valve can remain for prolonged periods of time in either the open or closed operational mode. This feature makes the valve of the present invention of particular use in industries that require only sporadic/infrequent valve control thus providing significant improvement over prior art valves with concomitant cost savings since the valve of the invention does need to be in a constant energised state.

Figure 3:
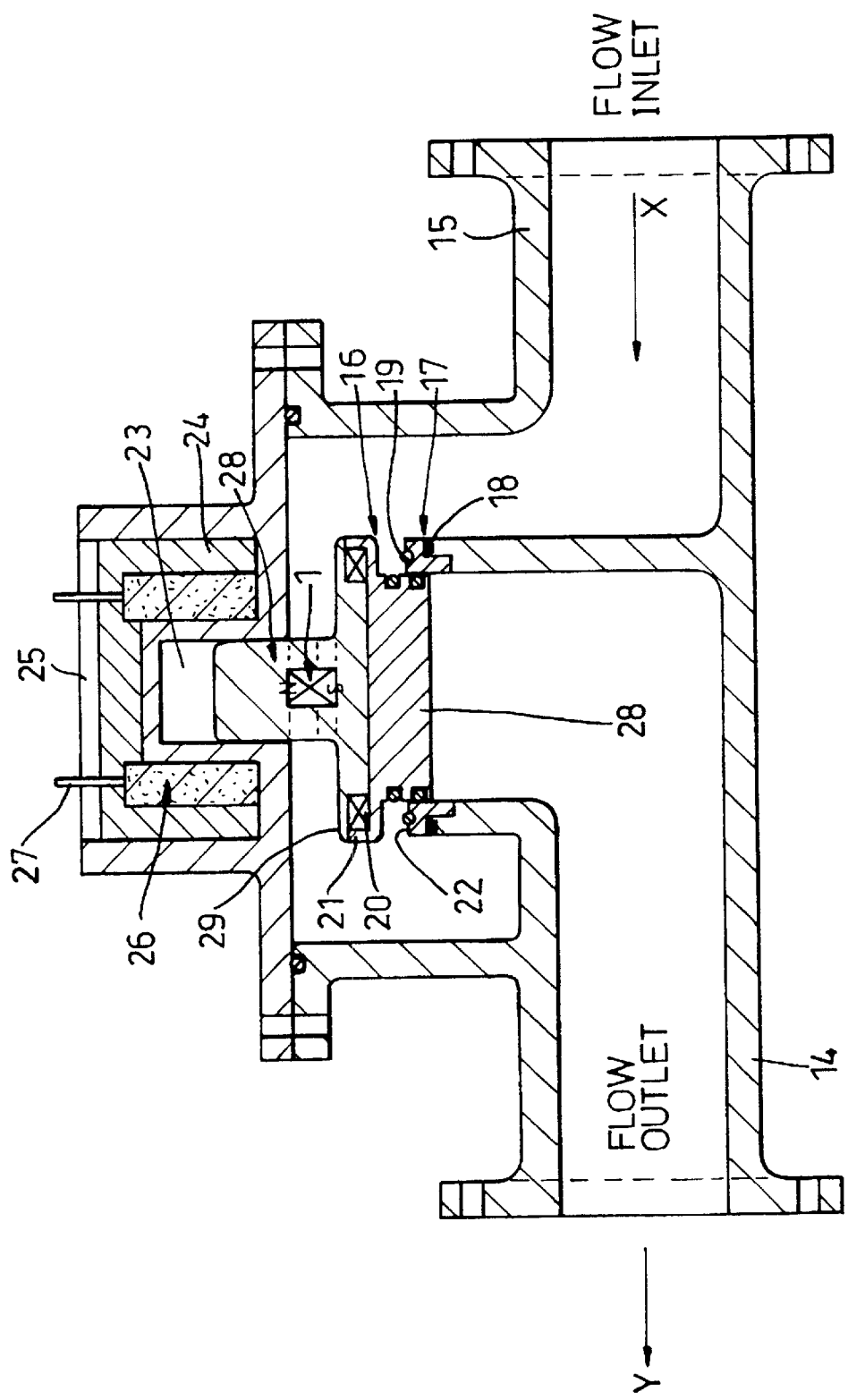
FIG. 3 represents a second embodiment of the valve according to the present invention.

With reference to FIG. 3 there is shown an alternative embodiment of the valve of the present invention. In this embodiment the pipes 14 and 15 are aligned along a common axis and fluid flow is in the direction of X to Y. Rare earth magnet 1 is embedded in a magnet housing 16 which is appropriately fashioned so as to abut a magnetic seat 17 when the valve is in a closed position. Small diameter magnets i.e. for use with valves of more than 2 inches (5 cms) diameter are positioned so as to form a circle around the magnetic seat 17. It is not practical to produce large diameter discs of rare earth metal magnets for use in valves of more than 2 inches (5 cms) diameter because rare earth magnets are inherently brittle and prone to damage by the action of the coil. Consequently it is necessary to design the units to prevent damage to the rare earth magnets during their operational life.

Magnetic housing 16 comprises at least 3 and preferably more magnets 20 positioned within arm 21 of the housing, the arms 21 in a fully closed position (not shown) abut in flush manner surface 22 of the magnetic seat 17. The magnetic seat 17 is associated with a number of seals 18 and 19, for effecting non-leakage. Portion 28 of magnetic housing 16 is constructed of non-magnetic material. The non-magnetic material 28 extends substantially around the perimeter of arms 21 until point 29, in accordance with the directional shading of the Figure.

In this particular embodiment, the rare earth magnet 1 and its associated housing 16 are substantially T-shaped in cross-section, the T being formed by arms 21 and a main body 28. In an open position the rare earth magnet and its associated housing main body 28 are held in position within recess 23. Recess 23 being formed within a top assembly 24 and comprises non-magnetic material in all the surrounding walls. Top assembly 24 is provided with an epoxy resin seal 25 at an uppermost surface and embedded within the top assembly are iron and iron ferrite cores, which can be energized by current applied to wires/plugs 27. The provision of epoxy resin seal 25 is one way to avoid deterioration of the magnet assembly, however the assembly could also be covered with plastics material or housed within a metal shield.

In operation the rare earth magnet 1 oscillates between the two said operational modes i.e. open and closed positions by reversing the direct current excitation voltage across the coil 26. Reversing the current acts to either attract or repel the rare earth magnet disc during periods of opening or closing the valve. In an open position, main body 28 of the magnet housing 16 sits within recess 23. Recess 23 acts as a dashpot thereby reducing the velocity of the rare and dampening the impact thus preventing any shock to the magnet when moving into recess 23.

On closing the valve, seal 19, a rubber O-ring positioned underneath magnetic housing arm 21 and on an upper surface of the magnetic seat 17 acts as a spring/cushion, which prevents damage to the magnet. In a closed position the arms 21 of magnet housing 16 abut surface 22 and seal 19 of magnetic seat 17. It is only necessary to energise coil 26 for a short period of time, typically 0.25–10 seconds in either direction. The period of excitation is relatively short because when the rare earth magnet disc is in an open position it is held in position by its own magnetic attraction to the iron or iron ferrite material employed in the coil construction. In a closed position, the rare earth magnet 1 is held in position by its magnetic attraction to magnetic materials in and around a valve seat 17 and by magnets 20, in addition to the differential pressure across the valve.

The valve of the present invention thus provides significant advantages over prior art valve assemblies in both cost and maintenance time in addition to having wide applications in a number of diverse industries.

What is claimed is:

1. A valve comprising a valve body and located therein, a valve member movable between a first position in which the valve is in a first operational mode adjacent a first magnetic or magnetizable member and a second position in which the valve is in a second operational mode adjacent a second magnetic or magnetizable member, the valve member being T-shaped in cross-section and including a first rare earth magnet located within an upright central portion and a plurality of additional rare earth magnets located in a circular configuration about said upright central portion and which, in conjunction with the first and/or second magnetic or magnetizable member, causes the valve member when in either one of said positions to be magnetically biased against movement towards the other of said positions, and wherein the second magnetic or magnetizable member generates a magnetic field sufficient to overcome the magnetic bias in the first or second position so as to cause said valve member to move to the other of said positions, the second magnetic or magnetizable member generating the magnetic field comprises a single coil lying outside the valve body and the valve body and valve member being arranged to prevent the valve member from passing through the coil.

2. The valve according to claim 1, wherein the valve body acts as a stop preventing the valve member from passing through the second magnetic or magnetizable member generating the magnetic field.

3. The valve according to claim 1, wherein the lateral extent of the valve member is greater than the lateral extent of the second magnetic or magnetizable member generating the magnetic field.

4. The valve according to claim 1, wherein the first magnetic or magnetizable member comprises a coil housing.

5. The valve according to claim 4, wherein the lateral extent of the valve member is substantially the same as the lateral extent of the coil housing.

6. The valve according to claim 4, wherein the coil is energized via a directly applied electrical current power supply.

7. The valve according to claim 4, wherein reversing current across the coil causes the rare earth magnet to be attracted or repelled, whereby the valve member is movable into either an open or closed position.

8. The valve according to claim 4, wherein the coil is energized by a rechargeable battery.

9. The valve according to claim 4, wherein the coil is composed of iron or iron ferrite.

10. The valve according to claim 1, wherein the second magnetic or magnetizable member comprises magnetic material.

11. The valve according to claim 1, wherein the valve member is provided with a plurality of rare earth magnets arranged in a substantially circular configuration.

12. The valve according to claim 11, wherein the rare earth magnets are evenly spaced apart.

13. The valve according to claim 1, wherein said at least one rare earth magnet comprises a member selected from the group consisting of neodymium, samarium and a combination thereof.

14. The valve according to claim 13, wherein the magnet includes, or magnets include, at least one element other than a rare earth element.

15. The valve according to claim 14, wherein the magnet includes, or magnets include, at least one element selected from the group consisting of iron, boron and cobalt.

16. The valve according to claim 13, wherein the rare earth magnet or magnets are capable of being permanently magnetized with its magnetic axis aligned in any selected direction.

17. The valve according to claim 13, wherein the rare earth magnet is a disc having substantially parallel faces.

18. The valve according to claim 17, wherein the disc is magnetized with its magnetic axis alleged perpendicular to said substantially parallel faces.

19. The valve according to claim 17, wherein the disc forms the valve member.

20. The valve according to claim 1, wherein the valve is substantially circular in plan and is of more than 5 cm in diameter.

21. The valve according to claim 1, further comprising means for causing said magnetic field to be generated for a period of between 0.25–10 seconds.

22. The valve according to claim 1, further comprising at least one static seals mounted on one or both of either the valve member or valve body to provide sealing therebetween.

* * * * *